(12) United States Patent
Stewart

(10) Patent No.: US 9,689,417 B2
(45) Date of Patent: Jun. 27, 2017

(54) FASTENER ARRANGEMENT WITH COMPRESSIBLE WASHER

(71) Applicants: Robert E. Stewart, Farmington Hills, MI (US); Nicholas Strumbos, Birmingham, MI (US)

(72) Inventor: Robert E. Stewart, Farmington Hills, MI (US)

(73) Assignees: Robert E. Stewart, Farmington Hills, MI (US); Nicholas Strumbos, Birmingham, MI (US)

( * ) Notice: Subject to any disclaimer, the term of this patent is extended or adjusted under 35 U.S.C. 154(b) by 328 days.

(21) Appl. No.: 14/473,032

(22) Filed: Aug. 29, 2014

(65) Prior Publication Data

US 2016/0061248 A1    Mar. 3, 2016

(51) Int. Cl.
   *F16B 43/00*   (2006.01)
   *F16B 31/02*   (2006.01)
   *F16B 5/02*    (2006.01)

(52) U.S. Cl.
   CPC .......... *F16B 31/028* (2013.01); *F16B 5/0241* (2013.01)

(58) Field of Classification Search
   CPC .............................. F16B 31/028; F16B 5/0241
   USPC ................................ 411/531, 544, 545, 8–11
   See application file for complete search history.

(56) References Cited

U.S. PATENT DOCUMENTS

| | | | | |
|---|---|---|---|---|
| 1,320,259 A | * | 10/1919 | Martens ................... | F16B 39/24 238/349 |
| 2,103,546 A | * | 12/1937 | Morrell ................. | C08L 89/005 264/211.11 |
| 3,992,974 A | | 11/1976 | Miki et al. | |
| 4,958,970 A | | 9/1990 | Rose et al. | |
| 5,188,494 A | | 2/1993 | Hatin | |
| 5,415,511 A | * | 5/1995 | Damron ................... | E04D 5/142 411/155 |
| 5,628,587 A | * | 5/1997 | Lesslie ................ | E21D 21/0086 405/259.1 |
| 5,803,693 A | * | 9/1998 | Choiniere ............... | E04D 5/145 405/302.1 |
| 6,497,543 B1 | * | 12/2002 | Lyons ................ | B23K 35/0288 219/98 |

(Continued)

FOREIGN PATENT DOCUMENTS

GB    2326921    1/1999

*Primary Examiner* — Gary Estremsky
(74) *Attorney, Agent, or Firm* — Reising Ethington, P.C.

(57) ABSTRACT

A washer includes a domed central portion with a central opening establishing a longitudinal axis, a base wall extending in a direction radially outwardly from the axis, and an extension wall extending in a direction radially outwardly and axially away from the base wall. The washer also includes a curled radially outer periphery with a peripheral wall extending radially outwardly from the extension wall and in a direction axially away from the extension wall back toward the base wall. A fastener assembly includes the washer and a fastener having a shank extending through the central opening of the central portion. A fastener arrangement includes the fastener assembly and an object to which the fastener assembly is fastened. A product, and a related method, include a panel carried by an underlying support structure to which the shank of the fastener assembly is coupled, with the curled radially outer periphery engaging the panel.

14 Claims, 1 Drawing Sheet

(56) References Cited

U.S. PATENT DOCUMENTS 6,665,991 B2 * 12/2003 Hasan ...................... E04D 5/14
411/466

* cited by examiner

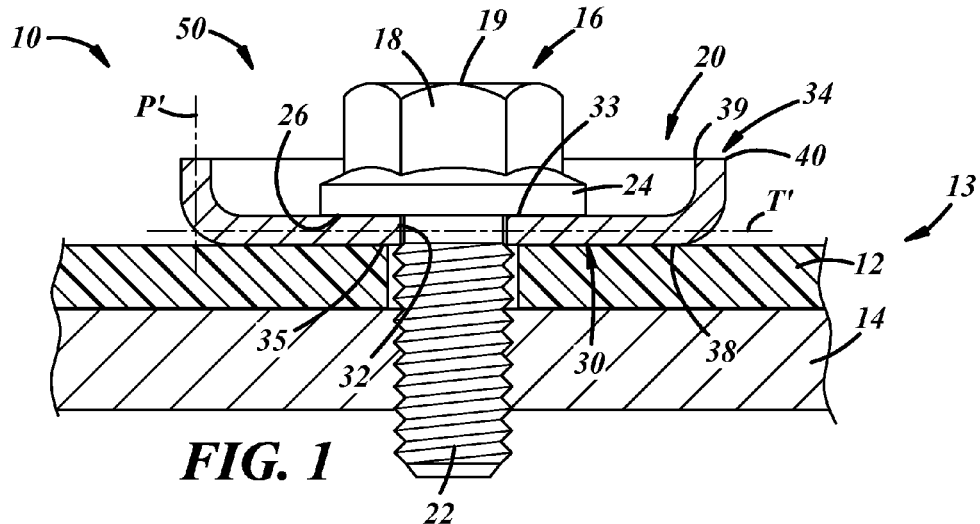
FIG. 1
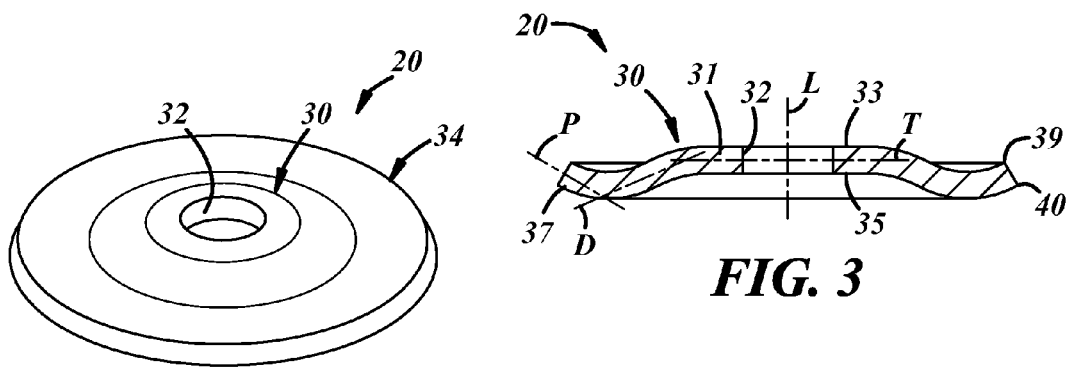
FIG. 2
FIG. 3
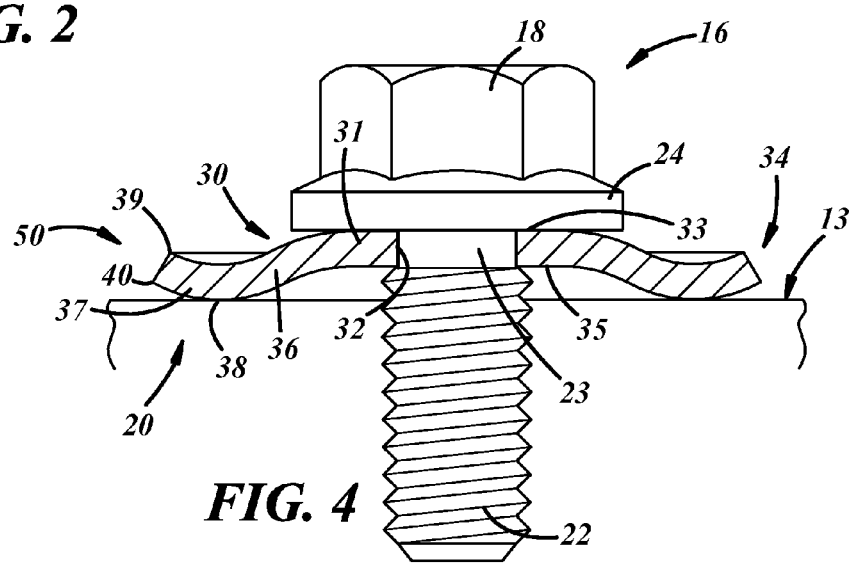
FIG. 4

FASTENER ARRANGEMENT WITH COMPRESSIBLE WASHER

The present disclosure is directed generally to fasteners and, more particularly, to collapsible washers and related fastener assemblies and products.

BACKGROUND AND SUMMARY OF THE DISCLOSURE

It is conventional practice to employ flat or conical washers beneath the head of a threaded fastener, such as a screw or nut, to help distribute the clamping stresses and load against the underlying structure. Such washers typically have relatively sharp edges that can abrade and damage the underlying structure such as a solar panel, particularly when the underlying structure is subjected to vibrations such as wind forces against a solar panel. It is a general object of the present disclosure to provide a fastener arrangement that addresses these shortcomings in the prior art.

The present disclosure embodies a number of aspects that can be implemented separately from or in combination with each other.

A fastener arrangement in accordance with one aspect of the present disclosure includes a threaded fastener, such as a screw or nut, having a head with an undersurface. A washer is disposed adjacent to the undersurface of the fastener head. The washer has a domed central portion that is outwardly convex beneath the head undersurface, a center opening, and a curled periphery that is outwardly concave adjacent to a periphery of the fastener head undersurface. When the fastener is threadably tightened against the washer, the fastener head collapses the central portion of the washer against the underlying structure and curls the periphery of the washer around the periphery of the head. The washer preferably comprises a body of revolution around the axis of its center opening. The fastener preferably comprises a screw with a threaded shank that extends through the center opening of the washer and to which the washer is assembled.

According to another aspect of the disclosure, a washer includes a domed central portion with a central opening establishing a longitudinal axis, a base wall extending in a direction radially outwardly from the axis, and an extension wall extending in a direction radially outwardly and axially away from the base wall. The washer also includes a curled radially outer periphery with a peripheral wall extending radially outwardly from the extension wall and in a direction axially away from the extension wall back toward the base wall. A fastener assembly includes the washer and a fastener having a shank extending through the central opening of the central portion. A fastener arrangement includes the fastener assembly and an object to which the fastener assembly is fastened. A product includes the fastener arrangement and a panel carried by an underlying structure to which the shank of the fastener assembly is coupled, with the curled radially outer periphery engaging the panel.

According to a further aspect of the disclosure, a method of producing a fastened product includes the following steps. A fastener assembly is coupled to an object, wherein the fastener assembly includes a fastener with a head and a shank extending from the head and coupled to an underlying structure, and a washer having a domed central portion with a central opening establishing a longitudinal axis and through which the fastener shank extends, a base wall extending in a direction radially outwardly from the axis, and an extension wall extending in a direction radially outwardly and axially away from the base wall, the washer also having a curled radially outer periphery with a peripheral wall extending in a direction radially outwardly and axially away from the extension wall back toward the base wall, wherein a rounded portion of the curled radially outer periphery engages a panel of the object that is carried by the underlying structure. Also, the fastener assembly is tightened to the underlying structure such that the central portion at least partially collapses and a radially outermost edge of the washer turns away from the panel. A product is produced by the method.

BRIEF DESCRIPTION OF THE DRAWINGS

The disclosure, together with additional objects, features, advantages and aspects thereof, will best be understood from the following description, the appended claims and the accompanying drawings, in which:

FIG. 1 is a fragmentary sectional view of a fastener arrangement in accordance with one embodiment of the present disclosure fastening an element such as a solar panel plate against underlying support structure, and in a tightened state;

FIG. 2 is a perspective view of a washer in accordance with the embodiment of FIG. 1;

FIG. 3 is a sectional view taken across the center of the washer illustrated in FIG. 2; and FIG. 4 is a partially sectioned elevational view of the fastener arrangement of FIG. 1, in a pre-tightened state.

DETAILED DESCRIPTION

FIG. 1 illustrates a fastener arrangement 10 in accordance with an illustrative embodiment of the disclosure securing a panel 12 against underlying support structure 14. Panel 12 can be a component of a solar panel assembly, for example, or of an automobile, or of any other suitable object using a fastener arrangement. Underlying support structure 14 can be a frame, bracket, or any other suitable structure for supporting panel 12. Fastener arrangement 10 includes a fastener 16 having a head 18, and a washer 20 disposed between head 18 and panel 12.

In the illustrative embodiment of the disclosure, fastener 16 comprises a bolt or screw in which head 18 is integrally formed with an externally threaded shank 22. In the illustrative embodiment, head 18 has an integrally formed flange 24 with an undersurface 26 that engages washer 20. In other embodiments, fastener 16 may include a nut.

Washer 20, as formed, is illustrated in FIGS. 2 and 3. Washer 20 has a domed central portion 30 with a central opening 32. Central portion 30 may be a dome such that it is outwardly convex in a direction facing fastener undersurface 26 (FIG. 1) and outwardly concave in a direction facing away from such undersurface 26. A radially outer periphery 34 of washer 20 curls upwardly relative to central portion 30 and is concave beneath a radially outer periphery of fastener head 18 (FIG. 4).

With reference to FIG. 3, as formed, washer 20 includes a longitudinal axis L around which washer 20 may be a body of revolution. Central portion 30 may include a base wall 31 that may extend along a transverse axis T, for example, perpendicularly with respect to the axis L. Base wall 31 may include a fastener engagement surface 33 and an axially oppositely disposed surface 35 that may engage object 13 (FIG. 1) to which fastener 16 may be fastened. Central portion 30 also may include an extension wall 36 that is downturned with respect to the base wall 31. Directional words such as upturned and downturned are used in their relative sense with respect to portions of washer 20 itself and not in an absolute sense. Accordingly, such words and others, like front, rear, top, bottom, upper, lower, and/or the like, are employed by way of description and not limitation. In any case, the extension wall 36 extends from a radially outer periphery of base wall 31 along a dome axis D at a non-zero angle with respect to transverse and/or longitudinal axes T, L, and in a direction that is radially outward and axially toward radially outer periphery 34. Extension wall 36 may extend at an obtuse angle with respect to base wall 31. For example, extension wall 36 may extend, with respect to the base wall 31, at an angle of about 155 degrees, or between 140 and 170 degrees, including all ranges and subranges therebetween. In any case, the extension wall 36 extends excurvately in a direction away from the fastener head 18.

Likewise, radially outer periphery 34 may include a peripheral wall 37 that is upturned with respect to base wall 31 in contrast to extension wall 36. In any case, wall 37 may extend from extension wall 36 along a peripheral axis P at a non-zero angle with respect to transverse and/or longitudinal axes T, L, and in a direction that is radially outward and axially away from the frustoconical wall 36 back toward the base wall 31. Peripheral wall 37 may extend at an obtuse angle with respect to extension wall 36. For example, peripheral wall 37 may extend, with respect to extension wall 36, at an angle of about 125 degrees, or between 110 and 140 degrees, including all ranges and subranges therebetween. Likewise, peripheral wall 37 may extend, with respect to base wall 31, at an angle of about 150 degrees, or between 135 and 165 degrees, including all ranges and subranges therebetween. In any case, the peripheral wall 37 extends incurvately in a direction back toward the fastener head 18.

With reference to FIG. 4, the fastener 16 and the washer 20 may be provided by a manufacturer as a subassembly 50, in which washer 20 is mounted on fastener 16, for example, on an unthreaded portion of shank 22 between head 18 and a threaded portion of shank 22. As formed, washer 20 includes an object engagement surface 38 axially oppositely disposed from fastener engagement surface 33, for engaging an object to which fastener 16 may be fastened during fastening thereof. Washer 20 may be bent and rounded at surface 38 so as to present a smooth surface and not a sharp edge to object 13. Radially outer periphery 34 includes an axial free edge 39 that may axially terminate radially outer periphery 34, and a radially outermost or free edge 40 that may radially terminate radially outer periphery 34. In initial engagement with an object 13 to which fastener 16 may be fastened, edges 39, 40 do not contact object 13. Accordingly, unlike prior washers, washer 20 tends not to abrade and damage objects with which it is in contact and/or coupled to.

In its as formed state, illustrated in FIG. 3, washer central portion 30 may project axially beyond axial free edge 39 of radially outer periphery 34. For example, fastener engagement surface 33 may be spaced axially beyond or above free edge 39, and even axially oppositely disposed surface 35 may be spaced axially beyond or above free edge 39. In another example, transverse axis T may bisect the thickness of base wall 31 and may be spaced axially beyond or above free edge 39.

Washer 20 preferably is formed in a stamping operation from spring steel of uniform thickness, and most preferably comprises a body of revolution around the longitudinal axis L through opening 32. For example, washer 20 may be composed of metal, for example, SAE 1050 to 1065 steel, or any other suitable steel, and may be heat treated, for example, via austempering, or any other suitable heat treatment. The hardness of the washer 20 may be between 40 and 48 hardness Rockwell scale (HRC) including all ranges and subranges therebetween, or any other suitable hardness. The size and thickness will be application specific but, in one example, the major diameter in an unstressed state may be about 16-17 mm and the thickness may be 0.6-0.7 mm. As an option, tabs or lugs could be provided within opening 32, or opening 32 could be made non-circular, to help retain washer 20 in assembly with fastener 16 as illustrated in FIG. 4.

In forming the assembly of FIG. 1, fastener 16 is initially threaded through washer 20 and panel 12 into support structure 14, as shown in FIG. 4. Thereafter, fastener 16 is tightened such that head 18 at least partially collapses central portion 30 of washer 20. For example, central portion 30 may be completely collapsed to the flat geometry of FIG. 1, which causes periphery 34 to be displaced radially outwardly and curl upwardly or away from object 13 toward head 18. The smooth radius of curvature around periphery 34 of washer 20 does not damage or abrade panel 12 during such tightening of fastener 16. Furthermore, full tightening of fastener 16 is observable by visually monitoring the geometry of the pre-tightened dome state of washer 20. Thus, when properly assembled, outside edge 40 of the washer turns away from panel 12, e.g. upwardly or toward head 18 as shown in FIG. 1, providing visual assurance of proper tightening.

From its position in FIG. 4, washer 20 is collapsed to its position in FIG. 1, by fastening of fastener 16 to object 13. More specifically, central portion 30 is collapsed such that base wall 31 and at least a portion of extension wall 36 extend along a common, flattened, transverse axis T'. Also, periphery 34 may be displaced such that peripheral wall 37 extends along a displaced peripheral axis P' for example substantially perpendicular to transverse axis T' and parallel with longitudinal axis L. As used herein, the term "substantially" includes within plus or minus three angular degrees. As fastened, periphery 34 may circumscribe fastener flange 24 such that there is a radial space therebetween, and axial free edge 39 may be axially spaced between flange 24 and a free end 19 of fastener head 18.

The rounded contour of periphery 34 of washer 20 does not dig into material of panel 12 during tightening. The as-made profile of washer 20 (FIGS. 2-4) may extend in a smooth rounded S-like contour from central portion 30 to periphery 34. The rounded contour of washer periphery 34 tolerates thermal expansion without damaging panel 12. The contour of washer 20 can be engineered to collapse under a very narrow range of loads, and each washer can be developed to match a specified fastener size and load specification. Also, as previously indicated, washer 20 provides a visual indication when correctly tightened. For example, the radially outermost edge 40 of the washer 20 extends axially beyond the flange 24 of the fastener head 18 to indicate complete tightening of the fastener assembly 50 to the object 13. Accordingly, washer 20 may enable use of fastener assembly 50 in a threaded fastener arrangement 10 for uniform distribution of a fastening load without damage to an object 13 to which fastener assembly 50 is coupled, and may indicate correct tightening of the fastener assembly 50 to the object 13.

Finally, a method of producing a fastened product may include the following steps. Fastener assembly 50 may be coupled to object 13, wherein curled radially outer periphery 34 engages panel 12 and fastener shank 22 is coupled to underlying support structure 14. Then, fastener assembly 50 may be tightened to underlying support structure 14 such that central portion 30 at least partially collapses and radially outermost edge 39 of washer 20 turns away from panel 12. The tightening step may include fully tightening fastener assembly 50 to underlying support structure 14 such that central portion 30 completely collapses wherein transverse and extension walls 31, 36 extend along common, flattened, transverse axis T'. Also, the method may include a step of loosening the fastener assembly with respect to the underlying support structure such that the washer elastically transforms back toward a pre-tightened configuration. It is believed that one or more of the material characteristics and the geometry of the washer 20 are conducive to achieving elastic transformation between the configuration illustrated in FIG. 4 and the configuration illustrated in FIG. 1. Accordingly, when the fastener 16 is loosened with respect to the object 13, the washer 20 can transform back toward the configuration shown in FIG. 4 so the fastener 16 and washer 20 can maintain a good hold down force on the object 13, despite the loosening of the fastener 16.

There thus has been presented a washer and a fastener assembly and arrangement that satisfies one or more of the objects and aims previously set forth. The washer and fastener assembly and arrangement of the disclosure have been presented in conjunction with exemplary embodiments, and modifications and variations have been discussed. Other modifications and variations readily will suggest themselves to persons of ordinary skill in the art in view of the foregoing discussion. For example, the fastener could comprise a nut instead of a screw, in which case the washer would be placed over a threaded stud or the like prior to assembly of the nut to the stud. The disclosure is intended to embrace all such modifications and variations as fall within the spirit and broad scope of the appended claims.

The invention claimed is:

1. A fastener arrangement that includes:
   a threaded fastener having a head including a free end, and a flange with an undersurface axially opposite of the free end and having an undersurface periphery, and
   a washer disposed adjacent to the undersurface of the threaded fastener, and having a domed central portion that is outwardly convex facing the undersurface and that has a planar fastener engagement surface, a center opening in the central portion, and a curled periphery having a free edge, and wherein the washer comprises a body of revolution around an axis of the center opening,
   wherein the threaded fastener and the washer are configured such that threaded tightening of the head against an underlying support structure collapses the central portion and curls the periphery of the washer around the periphery of the head with a radial space therebetween, and so that the free edge of the curled periphery of the washer is axially spaced between the fastener head flange and the fastener head free end to indicate complete tightening of the fastener arrangement to an object.

2. The fastener arrangement set forth in claim 1 wherein the threaded fastener comprises a head integral with an externally threaded shank, and wherein the center opening of the washer is assembled to the shank.

3. The fastener arrangement set forth in claim 1 wherein the washer is composed of spring steel of uniform thickness.

4. A washer comprising:
   a domed central portion having a planar fastener engagement surface with a central opening establishing a longitudinal axis, a base wall extending in a direction radially outwardly from the axis, and a downturned extension wall extending in a direction radially outwardly and axially away from the base wall, wherein the washer comprises a body of revolution around the axis of the center opening; and
   a curled radially outer periphery with a peripheral wall extending radially outwardly from the extension wall and in a direction axially away from the extension wall back toward the base wall.

5. The washer set forth in claim 4 wherein the extension wall extends at an obtuse angle with respect to base wall and the peripheral wall extends at an obtuse angle with respect to the extension wall.

6. The washer set forth in claim 4 wherein the extension wall extends at about 155 degrees with respect to the base wall and the peripheral wall extends at about 125 degrees with respect to the extension wall.

7. The washer set forth in claim 4 wherein the washer central portion projects axially beyond an axial free edge of the radially outer periphery.

8. The washer set forth in claim 7 wherein a transverse axis bisecting the thickness of base wall is spaced axially beyond the axial free edge.

9. The washer set forth in claim 4 wherein the washer is composed of spring steel of uniform thickness.

10. The washer set forth in claim 4 wherein the washer is composed of steel, is heat treated via austempering, and has a hardness of 40 to 48 HRC.

11. A fastener arrangement comprising an object and the fastener assembly set forth in claim 10 wherein the shank is coupled to the object and the curled radially outer periphery engages the object.

12. A fastener assembly comprising the washer set forth in claim 4 and a fastener having a shank extending through the central opening of the washer central portion.

13. A product comprising a panel carried by an underlying support structure, and the fastener arrangement set forth in claim 12 wherein the shank is coupled to the underlying support structure and the curled radially outer periphery engages the panel.

14. A washer comprising:
   a domed central portion having a planar fastener engagement surface with a central opening establishing a longitudinal axis, a base wall extending in a direction radially outwardly from the axis, and a downturned extension wall extending in a direction radially outwardly and axially away from the base wall; and
   a curled radially outer periphery with a peripheral wall extending radially outwardly from the extension wall and in a direction axially away from the extension wall back toward the base wall,
   wherein the extension wall extends between 140 and 170 degrees with respect to the base wall and the peripheral wall extends between 110 and 140 degrees with respect to the extension wall.

* * * * *